US012571902B2

(12) United States Patent
Bergen

(10) Patent No.: US 12,571,902 B2
(45) Date of Patent: *Mar. 10, 2026

(54) SYSTEMS AND METHODS FOR COMMUNICATING WITH VEHICLES USING RADAR

(71) Applicant: Deere & Company, Moline, IL (US)

(72) Inventor: Scott Bergen, New Canaan, CT (US)

( * ) Notice: Subject to any disclaimer, the term of this patent is extended or adjusted under 35 U.S.C. 154(b) by 87 days.

This patent is subject to a terminal disclaimer.

(21) Appl. No.: 18/771,322

(22) Filed: Jul. 12, 2024

(65) Prior Publication Data

US 2024/0361446 A1 Oct. 31, 2024

Related U.S. Application Data

(63) Continuation of application No. 17/479,629, filed on Sep. 20, 2021, now Pat. No. 12,066,523.

(51) Int. Cl.
*G01S 13/931* (2020.01)
*B61L 25/02* (2006.01)
(Continued)

(52) U.S. Cl.
CPC .......... *G01S 13/755* (2013.01); *B61L 25/025* (2013.01); *G01S 13/931* (2013.01); *G08G 1/095* (2013.01);
(Continued)

(58) Field of Classification Search
CPC .......... G01S 13/755; G01S 2013/9329; G01S 13/756; G01S 13/931; G01S 2205/002;
(Continued)

(56) References Cited

U.S. PATENT DOCUMENTS 4,027,840 A * 6/1977 Blair ..................... B61L 25/025
340/505
5,917,430 A * 6/1999 Greneker, III ... G08G 1/096716
340/936

(Continued)

FOREIGN PATENT DOCUMENTS

KR 19980020880 A 6/1998

OTHER PUBLICATIONS

Abatzoglou, et al., U.S. Appl. No. 17/375,994, entitled, "Methods and Systems for Processing Radar Signals," filed Jul. 14, 2021.
(Continued)

*Primary Examiner* — Calvin Cheung
(74) *Attorney, Agent, or Firm* — Gary L. Montle; Lucian Wayne Beavers; Patterson Intellectual Property Law, PC

(57) ABSTRACT

A radar-based system for communicating information to a vehicle uses spatially-encoded markers that are positioned proximate to a roadway traveled by the vehicle. The markers are designed to convey a unique radar signature that distinguishes the markers from other objects. The unique radar signature or marker characteristics are further interpreted by at least one controller on the vehicle as encoded messages. Marker distinguishing characteristics, such as size, shape, orientation and movement, provide distinct information to the controller. The controller may use the conveyed information to make control decisions for the vehicle or to display the conveyed information to occupants of the vehicle. In some cased, the controller may use the conveyed information to determine a location of the vehicle, such as a position of the vehicle within a lane.

20 Claims, 13 Drawing Sheets

(51) Int. Cl.
| | | |
|---|---|---|
| *G01S 13/75* | (2006.01) | |
| *G08G 1/095* | (2006.01) | |
| *H04W 4/021* | (2018.01) | |

(52) U.S. Cl.
CPC ....... *H04W 4/021* (2013.01); *G01S 2205/002* (2013.01)

(58) Field of Classification Search
CPC ...... H04W 4/021; B61L 25/025; G08G 1/095; G08G 1/09623
See application file for complete search history.

(56)                    References Cited

U.S. PATENT DOCUMENTS

| | | | |
|---|---|---|---|
| 2005/0046597 A1* | 3/2005 | Hutchison ............... | G08G 1/07 |
| | | | 340/917 |
| 2009/0048750 A1 | 2/2009 | Breed | |
| 2018/0330174 A1* | 11/2018 | Pratt ...................... | G01S 7/411 |
| 2019/0019408 A1* | 1/2019 | Beaulieu .................. | G08G 1/07 |
| 2019/0250269 A1* | 8/2019 | Miu ...................... | G05D 1/021 |

OTHER PUBLICATIONS

Bergen, U.S. Appl. No. 17/479,621, entitled, "Systems and Methods for Determining the Local Position of a Vehicle Using Radar," filed Sep. 20, 2021.
"Enhanced RADAR Positioning," Wikipedia, Jan. 13, 2019, https://en.wikipedia.org/wiki/Enhanced_RADAR_positioning.

* cited by examiner

122

SYSTEMS AND METHODS FOR COMMUNICATING WITH VEHICLES USING RADAR

CROSS-REFERENCE TO RELATED APPLICATIONS

This application is a continuation of U.S. patent application Ser. No. 17/479,629, entitled "SYSTEMS AND METHODS FOR COMMUNICATING WITH VEHICLES USING RADAR," and filed on Sep. 20, 2021, which is incorporated herein by reference.

TECHNICAL FIELD

The present disclosure is directed to systems and methods that sense spatially-encoded markers with radar signals for use in determining a location of a vehicle as it travels.

RELATED ART

Radar technology has been incorporated in many autonomous vehicles to aid in safe navigation. Generally, these radar systems include a transmitter that sends out radio waves and a receiver that detects the returning waves after they encounter an object. An autonomous vehicle, such as an autonomous automobile, then may determine the speed and distance of the object and, optionally, perform actions related to that information. For example, upon detecting an object within the trajectory of a vehicle, the vehicle may alert the driver or pilot, perform evasive actions to avoid a collision (e.g., when the vehicle is autonomous), or a combination of these or other actions. Further, radar systems in vehicles often work in conjunction with other sensing systems, such as cameras, to gather information related to the vehicle's environment and performance.

Current autonomous vehicle sensing systems primarily serve to aid in safe navigation by sensing the surroundings of a vehicle. For example, a uniform scan may be performed to range and detect objects in proximity to the vehicle. The sensing is often undertaken using cameras that interpret environmental details visually, and with optional assistance from other sensing systems. Cameras can detect visual detail such as the presence of signs, animals, vehicles, or road dividers and boundaries. However, cameras are limited by the potential for visual impairment due to poor weather conditions and low light, and visual data may not be sufficient for the detection of all relevant objects. Lidar (light detection and ranging) and radar (radio detection and ranging) are useful sensing systems that may be used in conjunction with visual detection systems due to their ability to operate advantageously in different navigational situations. For instance, lidar can detect small objects with high precision, while radar functions well over long distances and in a wide range of weather conditions. While current applications of radar in autonomous vehicles are useful, other potentially valuable applications remain underdeveloped or unexplored. The present disclosure is directed to radar-based sensing systems and methods for implementation on vehicles. These radar systems and methods function as an improvement over the current vehicle sensing systems by conveying a wider range of information for interpretation by vehicle controller systems.

SUMMARY OF THE DISCLOSURE

In some embodiments of the present disclosure, a system for communicating information to vehicles is provided. The system includes at least one spatially-encoded marker and a vehicle. The vehicle has at least one controller and a radar, and the radar is configured to transmit a radar signal and receive returns of the radar signal from the spatially-encoded marker. Further, the controller is configured to determine a message encoded by the spatially-encoded marker based on the returns. In some aspects, the controller is configured to control the vehicle based on the message. In some aspects, the controller is configured to display information from the message to occupants of the vehicle.

In some embodiments, the controller is configured to identify a spatial pattern of at least one spatially-encoded marker based on the returns and to determine a message based on the identified spatial pattern. The at least one spatially-encoded marker may include at least a first maker and a second marker, and the spatial pattern may include a spacing between the first marker and the second marker. In some instances, a spatially-encoded marker comprises a plurality of elements, and the spatial pattern may include an orientation of the plurality of elements.

In some embodiments, the controller is configured to identify a movement pattern of at least one spatially-encoded marker based on the returns and to determine a message based on the identified movement pattern. For example, a spatially-encoded marker may comprise a movable element and an actuator coupled to the movable element, and the actuator may be configured to move the movable element. In addition, the controller may be configured to determine a value indicative of a speed of movement of the movable element and then to determine the message based on the value. In some embodiments, the controller is configured identify a spatial or movement pattern of at least one spatially-encoded marker and to interpret the spatial or movement pattern as a binary stream. In some embodiments, the controller is configured to determine a location of the spatially-encoded marker based on the message. The controller may also be configured to determine a location of the vehicle based on the determined location of at least one spatially-encoded marker.

In another aspect of the present disclosure, there is provided a method for communicating information to a vehicle. The method includes transmitting a radar signal from a radar on the vehicle and receiving, with the radar, returns of the radar signal from at least one spatially-encoded marker. The method further includes determining, with at least one controller on the vehicle, a message encoded by the spatially-encoded marker based on the returns. The vehicle may be controlled based on the message.

In some embodiments, the method further includes identifying a spatial pattern of at least one spatially-encoded marker based on the returns, the message may be determined based on the identified spatial pattern. In some embodiments, the at least one spatially-encoded marker comprises at least a first maker and a second marker, and the identifying comprises determining a spacing between the first marker and the second marker. In some embodiments, the at least one spatially-encoded marker comprises a plurality of elements, and the identifying comprises determining an orientation of the plurality of elements.

In some embodiments, the method includes identifying a movement pattern of the at least one spatially-encoded marker based on the returns, the message may be determined based on the identified movement pattern. In some instances, the spatially-encoded marker comprises a movable element, and the method further comprises detecting movement of the movable element, where the determining of the message is based on the detected movement of the movable element. In some instances, the method includes determining a value indicative of a speed of movement of the movable element, and the message may be determined based on the value.

A further understanding of the nature and advantages of the present invention will be realized by reference to the remaining portions of the specification and the drawings.

BRIEF DESCRIPTION OF DRAWINGS

The present disclosure can be better understood, by way of example only, with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure is generally directed to systems and methods for communicating information to vehicles with radar using spatially-encoded markers. In some embodiments of the present disclosure, radar reflective markers are located near or along a path usable by a vehicle, which can be autonomous or driven by a driver. The locations of the radar reflective markers are such that they are detectable using vehicle-based radar. A radar transmitter located on or within a vehicle produces one or more electromagnetic waves, such as radio waves, which then encounter the disclosed radar reflective markers and reflect off the markers. Reflected waves from a given marker return to a radar receiver on or within the vehicle, conveying unique and unambiguous information related to at least one characteristic of the radar reflective marker or spatial arrangement of radar reflective markers. In this manner, the vehicle may interpret the detected signals to indicate the location, speed, or lane position of the vehicle, as well as information about the vehicle's environment, such as mile markers, traffic direction, or adverse road conditions. Vehicles may utilize the information conveyed by the radar reflective markers in various ways, such as to provide an alert to a driver or passengers, perform evasive maneuvers, adjust vehicle velocity or position, or otherwise control the vehicle.

Figure 1:
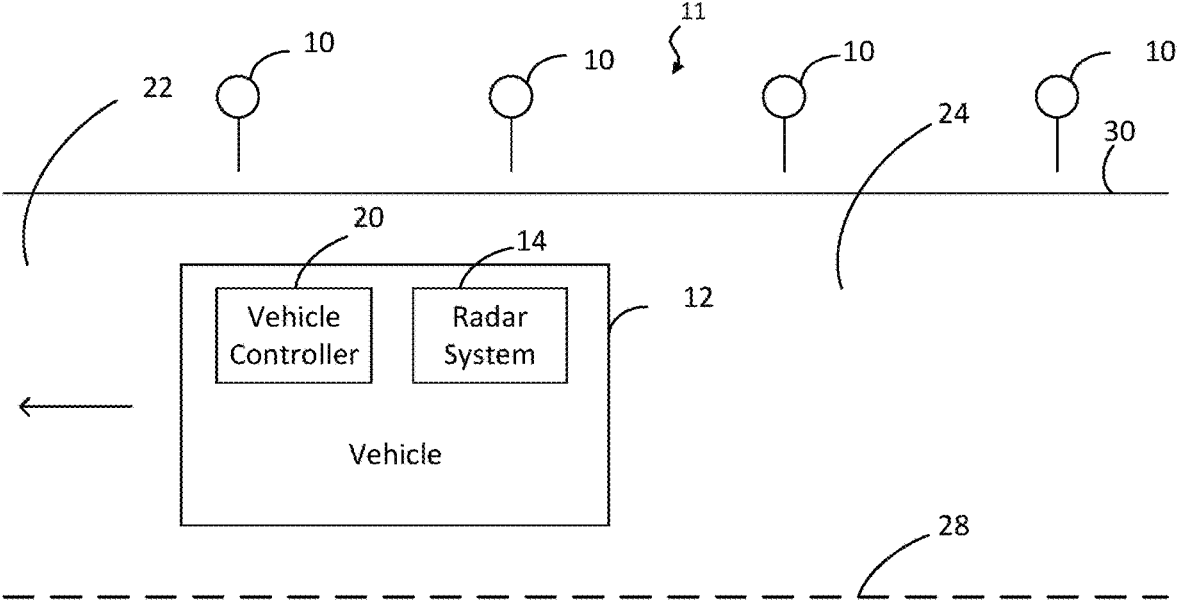
FIG. 1 is a schematic illustration of an exemplary embodiment of a radar-based information system of the present disclosure, with markers located outside of a radar-equipped vehicle to convey information to the vehicle.
Figure 1:
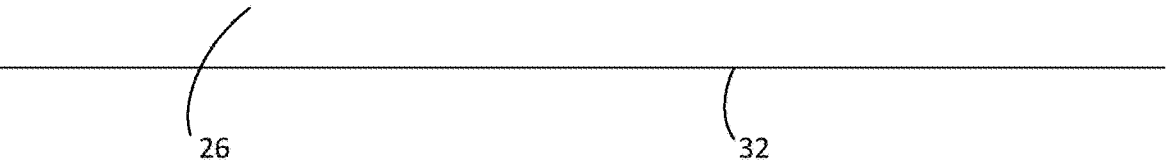
Figure 2:
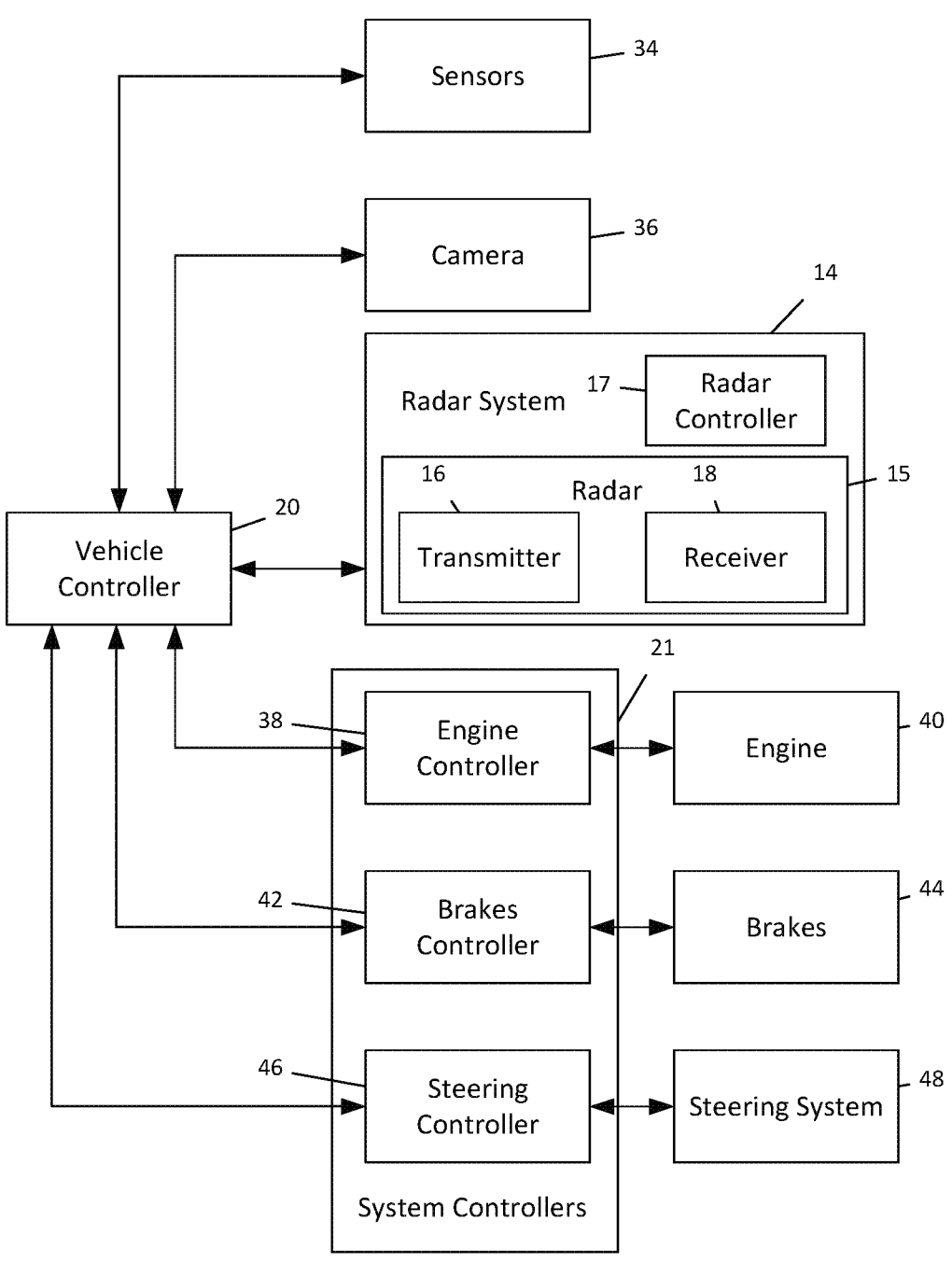
FIG. 2 is a block diagram illustrating components of a vehicle for detecting, interpreting, and reacting to information provided by radar reflective markers, such as are depicted by FIG. 1.
Figure 3:
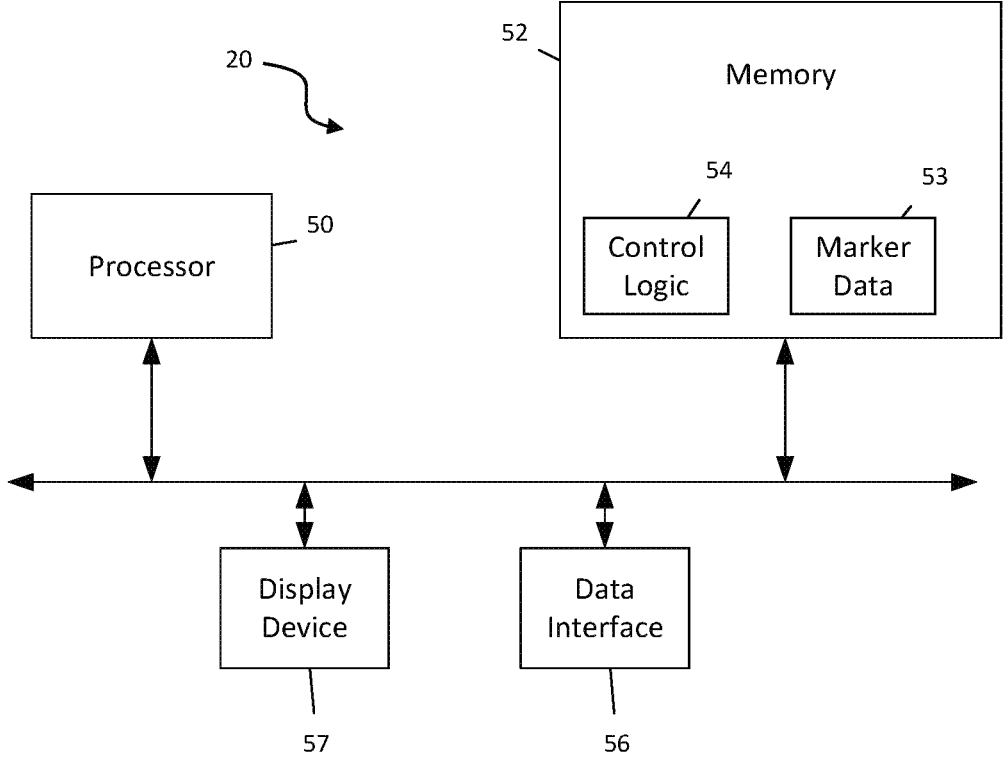
FIG. 3 is a block diagram illustrating an exemplary embodiment of a vehicle controller, such as is depicted by FIG. 2.
Figure 11:
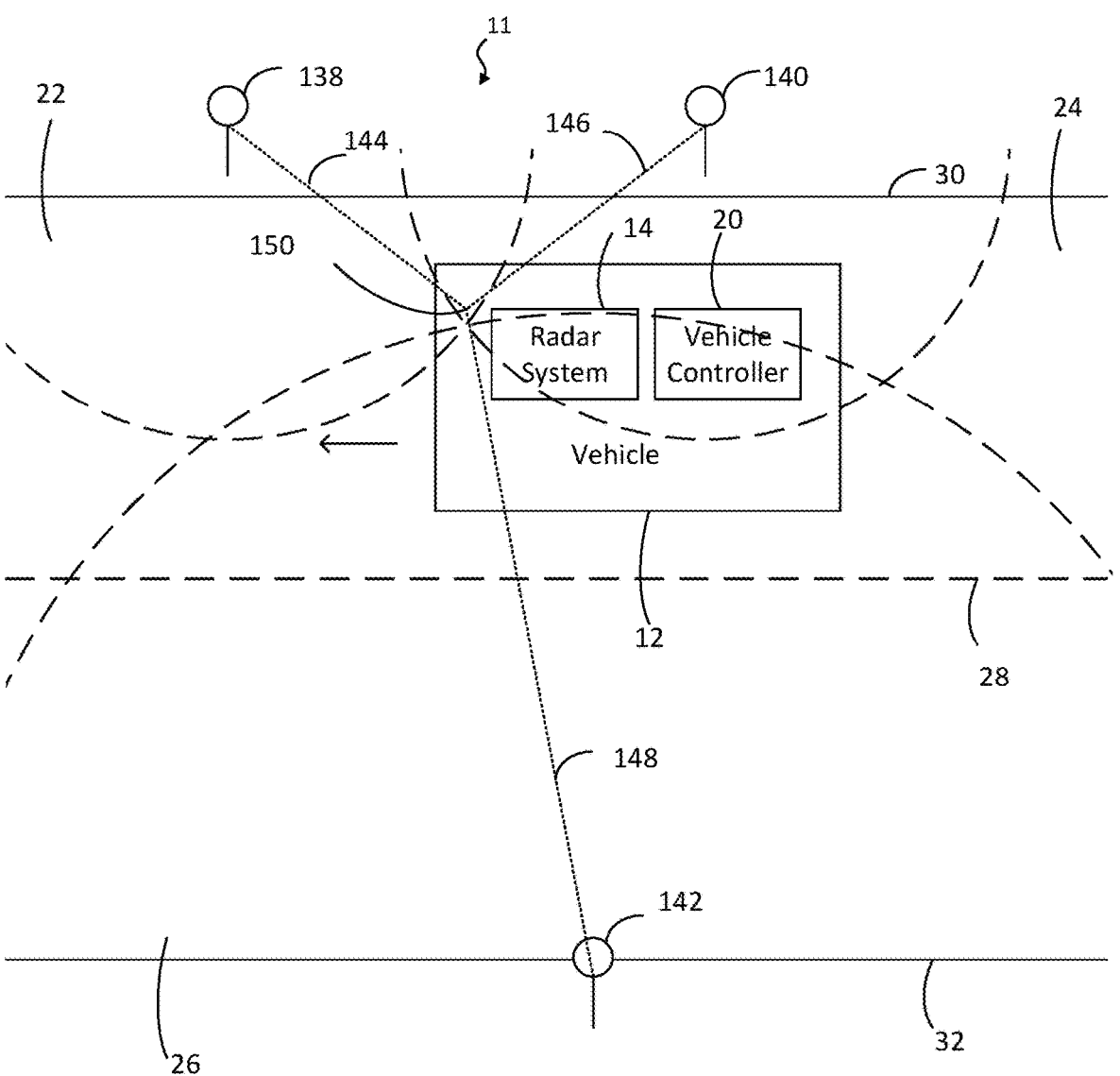
FIG. 11 is a schematic illustration of an exemplary embodiment of a radar-based information system of the present disclosure, where multilateration is employed using several markers to determine the location of a vehicle.
Figure 12:
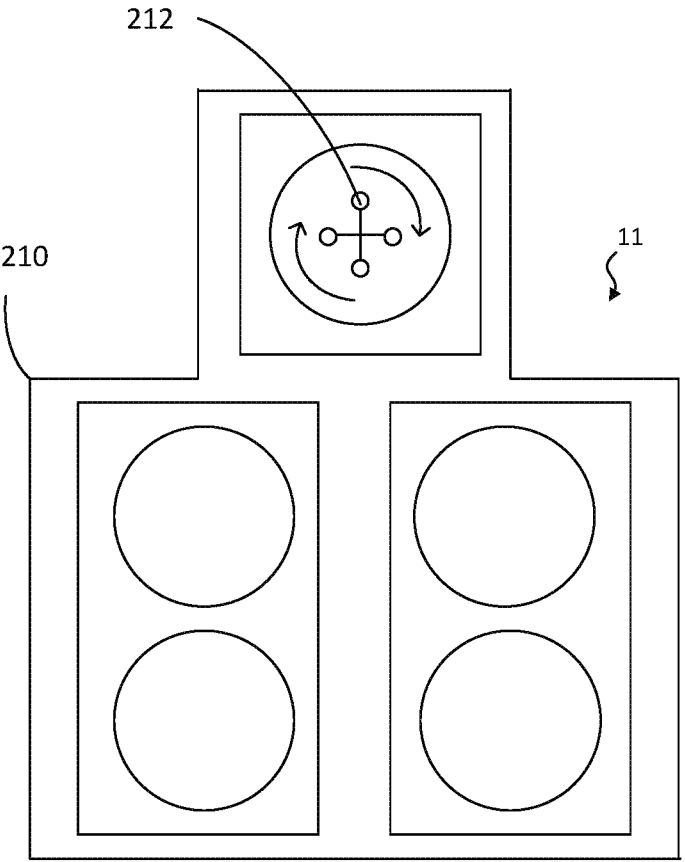
FIG. 12 is a schematic illustration of an exemplary embodiment of a radar-based information system of the present disclosure, where spinning actuated markers are present in a traffic light to indicate a state (e.g., color) of the light.
Figure 13:
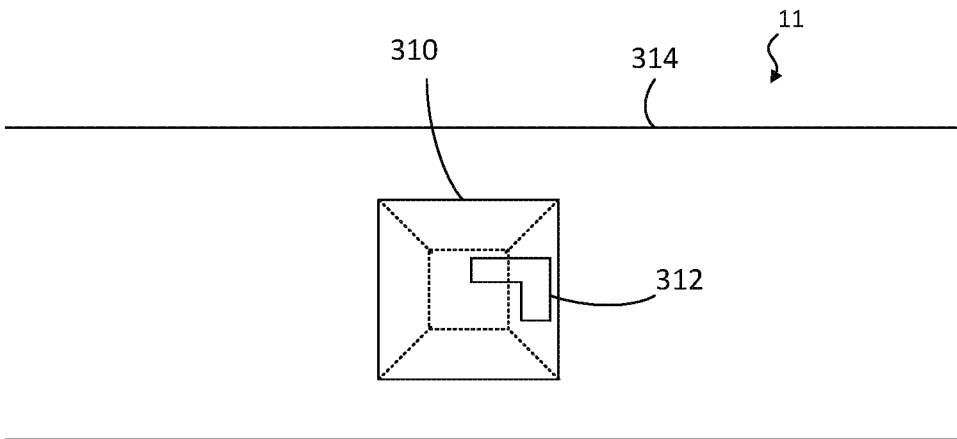
FIG. 13 is a schematic illustration of an exemplary embodiment of a radar-based information system of the present disclosure, where a radar reflective marker is embedded in a lane to convey unique and unambiguous information to a vehicle.

FIG. 1 depicts an exemplary embodiment of a radar-based information system 11 of the present disclosure. As shown by FIG. 1, the system 11 has radar reflective markers that are illustrated in a position to convey unique and unambiguous information to a vehicle equipped with a radar system. FIGS. 2-3 show components of the vehicle and a vehicle controller, respectively, for detecting, interpreting, and communicating information provided by the radar reflective markers. In FIGS. 4-10, the number, shape or shapes, and spatial relationship among the reflective markers or marker elements provide a unique radar signature that may be interpreted as coded information. FIG. 11 illustrates how radar reflective markers may be utilized through multilateration or other algorithms for determining the local position of a vehicle. FIG. 12 shows an embodiment of the present disclosure with an actuated spinning marker located within a traffic signal to provide traffic direction and signaling information through radar detection. In FIG. 13, another embodiment of the present disclosure includes radar reflective markers that are embedded in or on lane reflectors to provide lane location and vehicle positioning information.

As known in the art, the term "radar," which is also sometimes referred to as R.A.D.A.R or RADAR, refers to radio detection and ranging. Radar generally uses electromagnetic waves, such as radio waves, to detect objects and determine properties of the detected objects including, but not limited to, distance, angle, frequency, or velocity.

Referring to FIG. 1, radar reflective markers 10 are shown to be positioned proximate a roadway 22, such as along a side or shoulder of the roadway 22. However, markers 10 may be positioned in any location potentially detectable by a radar system 14, such as radar system 14 on a radar-equipped vehicle 12. Thus, markers 10 may be placed, either temporarily or permanently, proximate an intended path or trajectory of vehicles, including (but is not limited to) paved or unpaved paths, roadways, and parking locations or structures. Locations for markers 10 further include locations near, on, or in place of traffic signals, traffic signs or indicators, mile markers, infrastructure indicators, or other marking indicators or structures. In some instances, one or more markers 10 may be positioned relative to another object to indicate its position, as is discussed below in greater detail. In some instances, markers indicate lanes 24, 26, lane boundaries, or vehicle lane position relative boundaries such as road boundaries 30, 32 or a centerline 28, as is discussed below in greater detail.

Markers 10 are configured to be detectable using radar technology, and as such may be detectable in situations when visual detection systems are impaired. Such situations include inclement weather, such as snow cover, and low light conditions. Radar system 14 on vehicles 12 include a radar 15 with a radar transmitter 16 for transmitting electromagnetic waves, such as radio waves. Transmitted waves then encounter and reflect from objects in their proximity. According to the present disclosure, radar reflective markers 10 are configured to reflect transmitted waves back to vehicle 12 and for reception by a radar receiver 18 of radar 15, conveying a unique radar signature that identifies the object as a specific marker 10 (e.g., a marker 10 of a specific location or a marker 10 of a specific type), and in some cases the unique radar signature has encoded information that may provide a message corresponding to the marker 10. A controller 17 within radar system 14 may be used to determine object characteristic information. Notably, the information conveyed by a given marker 10 may be predefined or dynamically changed. Regardless of the type of information conveyed, the markers 10 may be differentiated from other objects detected by the radar system 14 by the unique radar signature of markers 10. Information conveyed to the vehicle by one or more of the markers 10 may be transmitted to a vehicle controller 20 for further interpretation, storage, communication, and/or direction of responsive actions.

Note that the controller 17 within the radar system 14 may be implemented in hardware or a combination of hardware with software and/or firmware. As an example, the controller may comprise one or more field programmable gate arrays (FPGAs) or application-specific integrated circuits (ASICs).

In some embodiments, the controller 17 has software that is executed by one or more processors (not specifically shown) of the controller 17.

FIG. 2 depicts various components of the vehicle 12 depicted by FIG. 1, including a vehicle controller 20 that may be used to react to the information conveyed by one or more markers 10. The vehicle controller 20 may receive information regarding the vehicle's environment, operation, location, and other parameters from vehicle system controllers 21, as well as from sensors 34, cameras 36, and radar system 14. Vehicle system controllers 21 include, for example, engine controllers 38 for managing the operation of and communicating with engine 40, brakes controller 42 for managing the operation of and communicating with brakes 44, and steering controller 46 for managing the operation of and communicating with steering system 48. Vehicle controller 20 further communicates with cameras 36, sensors 34, and radar system 14 for the assessment of the vehicle's environment. Applications for cameras 36 include those related to vehicle environment and location sensing, and rely on visual identification and interpretation of the vehicle's exterior environment. Cameras 36 may operate with or without other sensors 34 or radar system 14 to provide environmental and vehicular information. For example, a camera 36 may visually detect the boundaries of a lane 24 in which vehicle 12 is traveling, while radar system 14 detects the presence of an object within the trajectory of vehicle 12 in lane 24. The information provided by both camera 36 and radar system 14 may be provided to the vehicle controller 20 to be interpreted and used to control the velocity and thus location of the vehicle 12. Other sensors 34 include, but are not limited to, accelerometers, tachometers, speedometers, global positioning systems (GPS), light detecting and ranging (LIDAR) systems, temperature sensors, emission sensors, pressure sensors, and fluid level sensors.

In FIG. 2, the vehicle controller 20 further communicates with vehicle system controllers 21 to receive information about vehicle operations and to direct the systems which are controlled by vehicle system controllers 21. For instance, the vehicle controller 20 may direct engine controller 38 to alter operations of engine 40 (e.g., thrust generated by the engine 40), brakes controller 42 to initiate, stop, or change the operation of brakes 44, or steering controller 46 to alter the direction of the vehicle using steering system 48. In some instances, vehicle controller 20 directs more than one system to alter vehicle operations simultaneously or otherwise.

Further, in FIG. 2 radar system 14 serves to process signals encountered from the environment of vehicle 12 and to provide data characteristics of objects to vehicle controller 20 for interpretation. Such characteristics include object size, shape, orientation, elevation, and range, though other characteristics are contemplated by the present disclosure. In processing signals from the radar 15, the radar controller 17 may determine object location information based on a local coordinate system relative to the vehicle 12, which may be further coordinated with a global coordinate system by the vehicle controller 20 or the radar controller 17 to determine global positioning. The data characteristics may be interpreted by the vehicle controller 20 or radar controller 17, as described in greater detail below. In some instances, information regarding markers 10 is determined by the radar controller 17 based on raw radar data from the radar 14 and is used by the radar controller 17 to identify markers 10, while in other instances marker identification may be undertaken by the vehicle controller 20 using raw radar data from radar system 14.

In a preferred embodiment, radar system 14 processes signals encountered from the environment of vehicle 12 and identifies markers 10 within the environment of vehicle 12. In radar system 14, radar controller 17 is configured to communicate with other elements within radar system 14, such as transmitter 16 and receiver 18. Radar controller 17 includes control logic that is implemented in software, as well as a processor configured to retrieve and execute instructions from the control logic to perform the functions ascribed herein to the radar controller 17. For instance, when raw data characteristics of an object or objects detected by radar system 14 are communicated to radar controller 17, radar controller 17 is configured to identify or reject the object or objects as a marker 10. This identification includes detection of object size, shape, location, number, or other characteristics indicative of a marker 10. Radar controller 17 receives raw radar data from the radar 15 and may use the raw radar data to determine the object's azimuth, elevation, range, Doppler, and micro-Doppler dimensions, which are interpreted by radar controller 17 to identify the object or group of objects as a marker 10 or other, non-marker object. Radar system 14 may communicate the identity of an object as a marker, as well as object characteristics of azimuth, elevation, range, Doppler, and micro-Doppler dimensions, to vehicle controller 20 for further calculations or identifications, as described below in greater detail.

FIG. 3 depicts an exemplary embodiment of the vehicle controller 20. The exemplary vehicle controller 20 depicted by FIG. 3 comprises control logic 54 that is configured to control the vehicle controller 20. The control logic 54 may be implemented in hardware, software, or any combination thereof. In the exemplary embodiment, depicted by FIG. 3, the control logic 54 is implemented in software and stored in memory 52 of the controller 20. However, other configurations of the control logic 54 are possible in other embodiments. The control logic 54 may be configured to process data from one or more sensors or vehicle systems, calculate or determine values or parameters from the data, store information in memory 52, and process information from the radar system 14 (FIG. 2), as will be described in more detail below.

As shown by an embodiment in FIG. 3, the vehicle controller 20 may have at least one processor 50 configured to communicate with and drive other elements within the controller 20 via at least one bus. As an example, the processor 50 may be a digital signal processor (DSP), central processing unit (CPU), or any instruction execution apparatus that is configured to retrieve and execute instructions from memory 52. As an example, when the control logic 54 is implemented in software, the processor 50 may be configured to retrieve and execute instructions from the control logic 54 to perform the functions ascribed herein to the vehicle controller 20. For instance, when raw data characteristics of an object or group of objects detected by radar system 14 are communicated to vehicle controller 20, control logic 54 may be implemented to identify or reject the object or group of objects as a marker 10. Further, control logic 54 may determine that the characteristics of a marker 10 convey a unique signature corresponding to an entry or entries in memory 52. Further still, control logic 54 may determine a message that is encoded by the marker 10, such as a warning, an identifier (e.g., marker or location identifier), notification, or other type of message. Note that in some instances, the encoded message may be a pointer that can be used to retrieve information from a database or other type of memory, such as a warning, an identifier, a notification, or any other type of information described herein.

As shown by FIG. 3, marker data 53 may be stored in memory 52 and used by the control logic 54. The marker data 53 includes information related to the markers such as marker identifiers, marker locations, or other messages to be conveyed by the markers. For example, the marker data 53 may store an identifier of each marker in a particular region that a vehicle 12 may encounter. As an example, as the vehicle 12 enters a certain geographic region, the marker data 53 corresponding to that region may be downloaded from a remote server and stored in memory 53 for use while the vehicle 12 remains in that region. In some embodiments, the marker data 53 correlates each marker identifier within information indicative of the radar signature expected for the identified marker. Thus, upon detecting a signature of a given marker, the marker data 53 may be consulted to determine the marker identifier that is correlated with the signature.

In some embodiments, other types of information may be correlated in the marker data 53 with the marker identifier or the information indicative of the radar signature. As an example, a predefined message may be correlated with the marker identifier or signature. Thus, upon identifying a marker or its signature, the marker data 53 may be used to lookup a message to be conveyed by the marker. In some cases, the location of the marker may be correlated with the marker identifier or signature. Thus, upon identifying a marker or its signature, the marker data 53 may be used to lookup the marker's location. Such location may be indicated by coordinates, such as latitude and longitude, or other types of location information. Various other information about the markers may be indicated by the marker data 53 in other embodiments.

Note that in some embodiments, the radar system 14 may provide raw radar data to the vehicle controller 20, which analyzes the radar data to determine radar signatures and to compare the radar signatures to the marker data 53 to identify the markers that produced the signatures and/or messages associated with the signatures. In other embodiments, the controller 17 of the radar system 14 may be configured to process the raw radar data and to provide information indicative of the detected signatures, messages associated with the signatures, or identifiers of the markers that produced the signatures. Notably, the functions of processing and analyzing radar data may be performed by or distributed across the vehicle controller 20 and/or the radar controller 17 as may be desired. Specifically, any functions described herein as being performed by the vehicle controller 20 may be perform instead by the radar controller 17, and any function described herein as being performed by the radar controller 17 may be performed by the vehicle controller 20. Further, any number of controllers may be used to perform such processing and analysis. As an example, a single controller may receive raw radar data from the radar 15, process the raw radar data to determine information about objects in the environment, identify markers, and control the vehicle based on the identified markers.

In FIG. 3, a data interface 56 is provided to receive inputs from and convey outputs to systems and devices within vehicle 12. As an example the data interface 56 may be communicatively coupled (wired or wirelessly) to the sensors 34, camera 36, vehicle system controllers 21, and the radar system 14 depicted by FIG. 2, thereby enabling the controller 20 to communicate with any of these vehicle components. The controller 20 may also have a display device 57, such as a liquid crystal display (LCD), for displaying information. As an example, the controller 20 may display messages conveyed from one or more markers or otherwise determined from the conveyed information to occupants of the vehicle 12. For example, speed limit information, road hazard information, or other information pertinent to the operation of the vehicle 12 may be displayed to an occupant, such as a driver of the vehicle 12.

Figure 4:
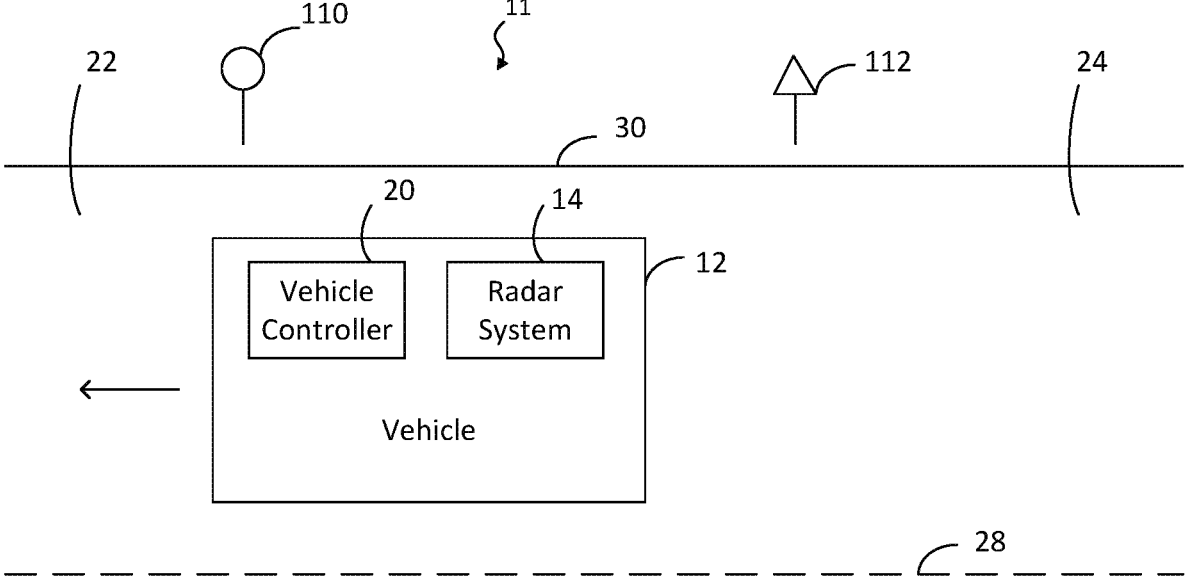
FIG. 4 is a schematic illustration of an exemplary embodiment of a radar-based information system of the present disclosure, where a characteristic of marker shape conveys unique and unambiguous information to a vehicle.
Figure 4:

Referring to FIG. 4, the vehicle 12 is positioned to detect unique radar signatures corresponding to multiple markers 10, such as a first marker 110 and a second marker 112. In the depicted embodiment, the markers 110 and 112 have different shapes, which correspond to unique identities and radar signatures. However, as described in greater detail below, other characteristics of markers 10 may be used to provide unique signatures and encode distinct information. Different types of marker characteristics, such as shape, location, distance or spacing from other markers, number of reflective elements, relative positions of reflective elements, actuated speed, and actuated frequency, may be used to convey distinct encoded information. The encoded information from markers 10 may include a pointer to one or more database entries, where the one or more database entries may include any information suitable for use in a system incorporating one or more of the radar markers. In some instances, more than one marker characteristic may be used to convey more than one type or encoded information. In some instances, more than one marker 10 is used to convey encoded information.

In a non-limiting example of marker characteristics for conveying encoded information, marker shape and orientation may be used to convey traffic regulations, such as a speed limit. In such an exemplary situation, a triangular shaped marker 112 may be recognized as corresponding to speed limits based on the marker shape. Further, the pattern or orientation of the triangle of marker 112 may convey the numerical value of the speed limit, such as a vertex facing downward indicating a value of 25 miles per hour or a vertex facing upwards indicating a value of 65 miles per hour. In this example, radar system 14 detects marker 112 and its characteristic shape, size, and orientation and provides this information as raw data to vehicle controller 20. From the raw data, vehicle controller 20 implements control logic 54 to recognize marker 112 as a marker and to identify the unique signature provided by marker 112, and then looks up all corresponding information from memory 52 related to the identified unique signature.

Additional non-limiting examples of the encoded information or the database entries may include a surveyed location, a specific location, structure, or other object along a thoroughfare, including a roadway, bridge, or tunnel, one or more of a distance and direction to an object, coordinates of the marker or an object in Earth Centered Earth Fixed (ECEF) reference frame.

The disclosed radar markers 10 may be utilized by radar system 14 with sufficient resolution in one or more of azimuth, elevation, range, Doppler, and micro-Doppler dimensions to discern the spatial information provided by the reflector elements in the same one or more dimensions. Alternately, radar markers 10 may be configured with a particular spacing in one or more of azimuth, elevation, range, Doppler, and micro-Doppler dimensions that allows the radar with a particular resolution in the same one or more dimensions to discern the spatial information provided by the reflector elements. In embodiments with a higher resolution radar, the marker spacing may be relatively smaller, while in embodiments with a lower resolution radar, it may be desirable for the marker spacing to be relatively larger to allow the radar system 14 to discern the desired characteristics for conveying information.

An example of a radar system 14 that may be used with the vehicle 12 is a 2-D MIMO sparse array system with a sparse array selected to minimize interpolation error of Doppler signals at virtual and missing array elements, which receives a Range-Doppler bin of radar return signals from one or more radar markers 10. The exemplary system estimates signals at virtual and missing 2D array elements, processes the signals at the virtual positions, obtains optimal estimates of principle target scatterers in elevation, azimuth, angles, and power, and renders and displays an ultra-high angle resolution of Doppler features of the one or more radar markers 10. The features may be analyzed and compared to a database of known features, or may be interpreted to realize the information encoded in the return signals. Further, the 2-D MIMO sparse array system provides at least an order of magnitude improvement in resolution of detected objects, allowing markers 10 to be recognized with smaller sizes than would be possible with other radar systems. Smaller markers 10 may result in a reduction in marker costs, permitting radar-based information system 10 to be implemented at a significantly lower cost. Exemplary 2-D MIMO sparse array systems are described in commonly-assigned U.S. application Ser. No. 17/375,994, entitled "Methods and Systems for Processing Radar Signals" and filed on Jul. 14, 2021, which is incorporated herein by reference. In other embodiments, other types of radar may be used.

Referring again to FIG. 4, marker shape, as indicated by the circular shape of marker 110 and triangular shape of marker 112, may be used to convey a unique radar signature for each marker 110, 112. For example, radar system 14 detects marker 110 to have a unique signature based on its circular shape, which may indicate that the marker 110 represents or defines a mile marker or position along roadway 22, while it detects marker 112 to have a different radar signature based on its triangular shape, which may indicate that the marker 112 represents or defines a speed limit for roadway 22. When marker 112 represents a speed limit, speed values may be further indicated by the size of marker 112, with particular sizes representing particular speed values. Other potential encoded information includes, but is not limited to road construction status, infrastructure locations, hazard information, weather information, mile markings, location information, speed limits, or other road, vehicle, or environment characteristic.

Figure 5:
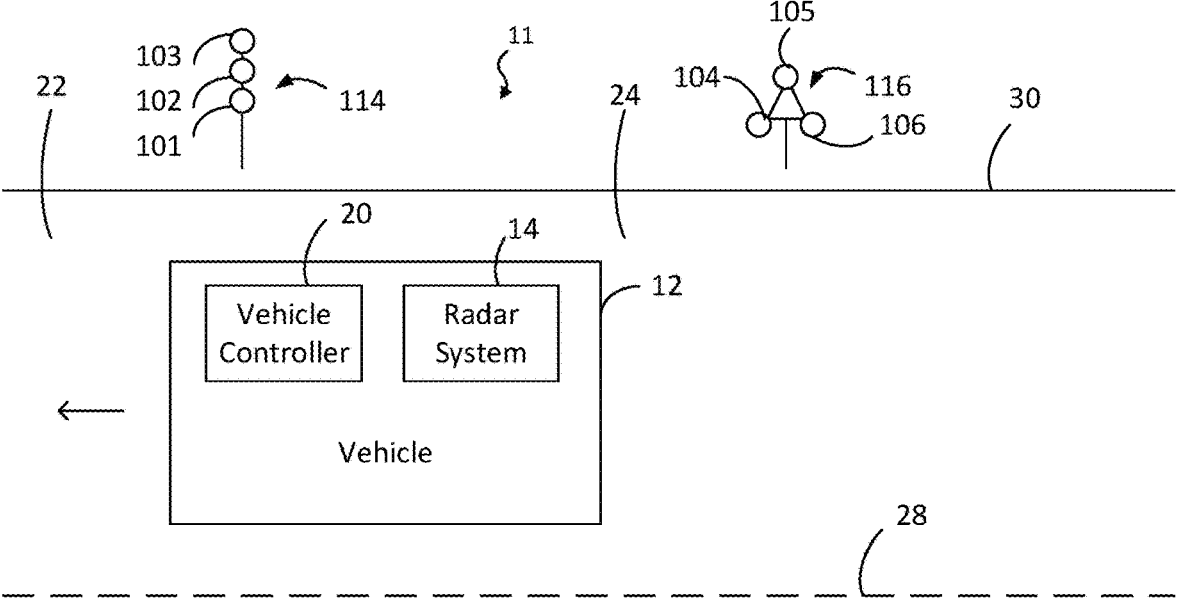
FIG. 5 is a schematic illustration of an exemplary embodiment of a radar-based information system of the present disclosure, where a characteristic of marker spatial configuration conveys unique and unambiguous information to a vehicle.
Figure 5:
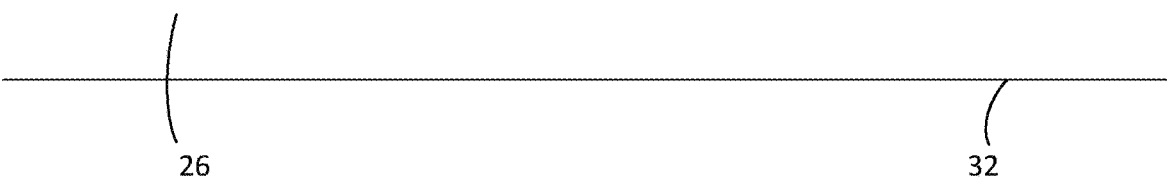

Referring to FIG. 5, reflector elements are included with a unique spatial pattern to provide a unique radar signature for markers 114 and 116. As an example, the multi-element marker 114 shown by FIG. 5 has three elements 101-103, and the multi-element marker has three elements 104-106. Each element 101-106 has a unique shape to facilitate identification of the element from other objects that may be in the environment. In the exemplary embodiment shown by FIG. 5, each element 101-106 has a circular shape with a predefined diameter and is spaced apart from the other elements of the same marker within a predefined range. As an example, each element 101-103 of marker 114 may be spaced from the next adjacent element 101-103 of the same marker 114 by no more than a threshold distance (e.g., about three inches). Thus, if the radar system 14 determines that a signature indicates that there are multiple circular objects of the predefined diameter that are positioned within at least a threshold distance of each other, then the radar system 14 may determine that the objects represent elements 101-103 of an encoded marker. Thereafter, the radar system 14 may analyze the spatial arrangement of the elements 101-103 or other characteristics of the marker to determine information conveyed by the marker. Note that FIG. 5 shows each marker 114 and 116 as having three elements, but a multi-element marker may have any number of elements in other embodiments.

As indicated above, after having identified a marker 114 or 116, the radar system 14 may analyze the spatial arrangement of its elements in order to decode information from the marker. As an example, the elements 101-103 of marker 114 are arranged in a straight line, whereas the elements 104-106 of marker 116 are arranged in a triangular pattern. The unique spatial pattern of marker 114 (i.e., three elements in a straight line) may convey certain information, and the unique pattern of marker 116 (i.e., three elements in a triangular pattern) may convey different information. Thus, by identifying the spatial pattern of the elements of a given marker, the radar system 14 can determine the information that is conveyed by the marker.

As an example, each spatial pattern may be unique to and indicate a marker type, such as a certain type of roadside sign. For example, the spatial pattern defined by the marker 114 may correspond to a stop sign indicating that the vehicle 12 should temporarily come to a stop at or near the marker 114, whereas the spatial pattern defined by the marker 116 may correspond to a yield sign indicating that the vehicle 12 should yield to other traffic at or near the marker 116. Various other marker types are possible in other embodiments. As an example, the spatial pattern of a marker may indicate that a hazard (e.g., a traffic accident, construction zone, or sharp turn) is close to the marker or is down road from the marker a short distance (e.g., 500 feet), thereby warning the driver of vehicle 12 or the vehicle controller 20 of the hazard so that appropriate action can be taken (e.g., decrease in speed).

In some embodiments, the spatial pattern of a marker may indicate only a portion of a message. As an example, multiple markers may be used to convey a message where each marker represents a portion, such as a digit, character, word, or phrase, of a message. As an example, the two markers 114 and 116 may form a speed limit message to convey the speed limit for the area in which the markers 114 and 116 are located. In such example, the marker 116 may convey a numerical value or digit (e.g., "6") and the marker 114 may convey another numerical value or digit (e.g., "5") such that a certain speed limit (e.g., 65 miles per hour) is conveyed by the two markers 114 and 116. In such example, the proximity of the markers 114 and 116 relative to one another may indicate that they are part of the same message. As an example, the radar system 14 may be configured to determine that two consecutive markers that are less than a threshold distance from each other are part of the same message. Other techniques for utilizing unique spatial patterns to convey information are possible in other embodiments.

Figure 6:
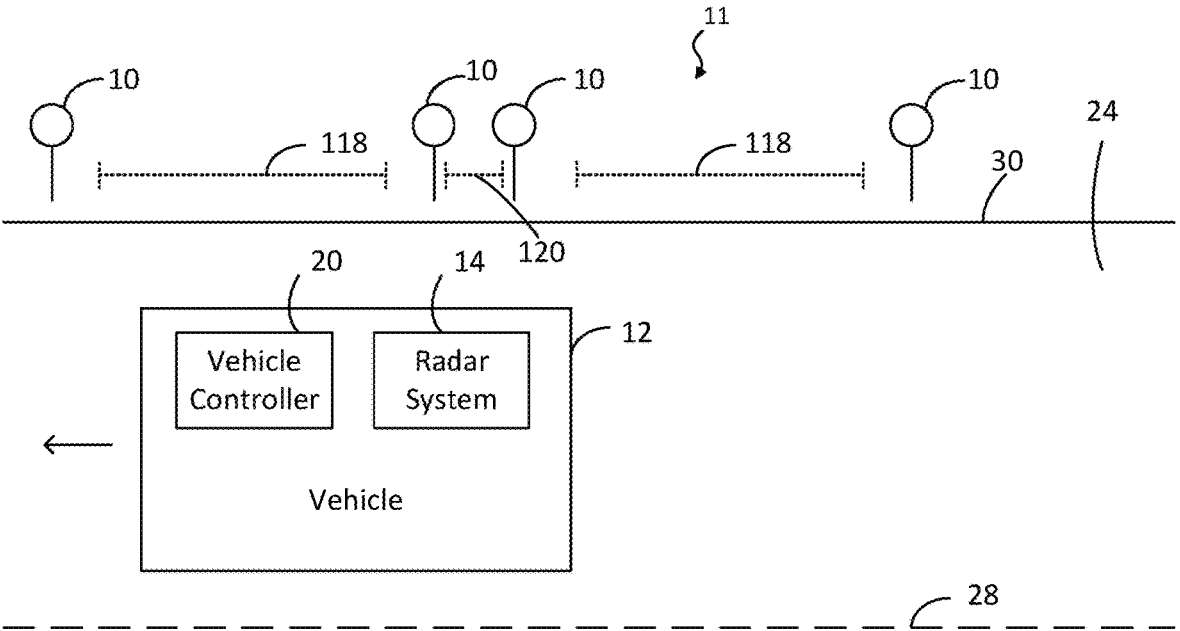
FIG. 6 is a schematic illustration of an exemplary embodiment of a radar-based information system of the present disclosure, where a characteristic of marker spacing conveys unique and unambiguous information to a vehicle.
Figure 6:
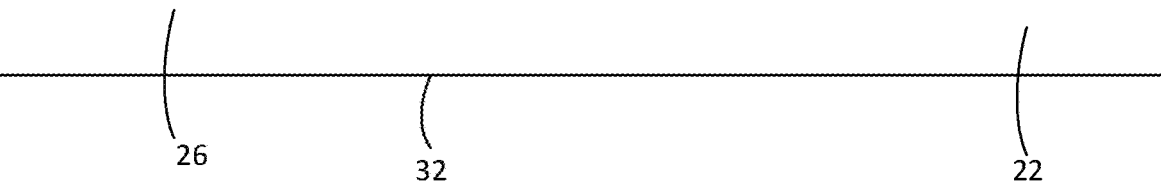

In FIG. 6, markers 10 include different spacings 118, 120, which convey unique radar signatures and distinct information from the markers 10. Markers 10 are detected by radar system 14 and their local position is determined. Vehicle controller 20 then determines spacings by recognizing each object or group of objects as a marker and, through control logic 54, recognizes spacing between each marker 10 as a unique signature. Thus, spacings of one length may correspond to first information, while spacings of a second length may correspond to different information. Further, a group of objects may indicate several markers 10 with different spacings providing further information, or may identify a group of objects with a certain spacing or organization as indicating one marker having a particular signature.

In the example depicted in FIG. 6, larger spacing 118 provides a first encoded message or parameter, while smaller spacing 120 provides a second encoded message or parameter. The first encoded parameter may, for example, indicate a higher speed limit, while the second encoded parameter may indicate a lower speed limit. Thus, vehicle controller 20 receives information based on the spacings of markers 10 that allows for control of vehicle systems 21 or for communication of such information to a driver or passenger of vehicle 12.

In another non-limiting example, spacing between markers 10 may directly encode messages. Modulation of spacings may be undertaken to form a binary or other type of pattern, which is recognized using control logic 54. As an example, a larger spacing 118 may indicate a binary "1", while a smaller spacing 120 may indicate a binary "0". All marker spacings within a particular range may then be interpreted as a binary message that can indicate unique information, such as an alert to road or traffic conditions. The message may be used to access a predetermined stored in memory 52 (e.g., point to a database entry or other memory location where a predefined message is stored), or may define a new message encoded using binary (e.g., the binary pattern defines a new message being conveyed).

Figure 7:
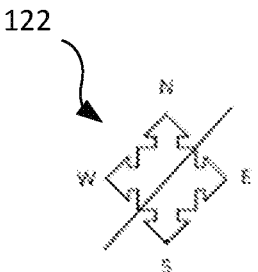
FIG. 7 is a schematic illustration of an exemplary embodiment of a radar reflective marker, such as is depicted by FIG. 1, where a directional-shaped marker conveys unique and unambiguous information to a vehicle.

In FIG. 7, directionally-shaped marker 122 is provided to convey information based on its shape. For instance, pointers may extend to specific cardinal directions, east, west, north, and south, and an indicator may be detectable on or between pointers to provide directional information to vehicle 12.

Now referring to FIGS. 8A-8D, actuated markers 124 and 132 are depicted, respectively. In both depicted examples, markers 124 and 132 are driven by an actuator 130, which provides motion that is interpreted as a unique radar signature. Actuator operation is described in more detail below. Actuation includes the movement of one or more elements 128, 136 about a point of rotation, such as by the movement of arms 126, 134. Movement may include full rotation about a point of rotation or rotation within a range of angles about a point of rotation. Movement includes increases or decreases in speed or velocity, or changes in rotational direction. Actuation may further include a cessation of motion of elements 128, 136. Elements 128, 136 are depicted as circular and as attached to arms 126, 134 that pivot about a central point of rotation in FIGS. 8A-8D, though other element and arm shapes, sizes, lengths, numbers, and positions are compatible with the present disclosure.

Figure 10:
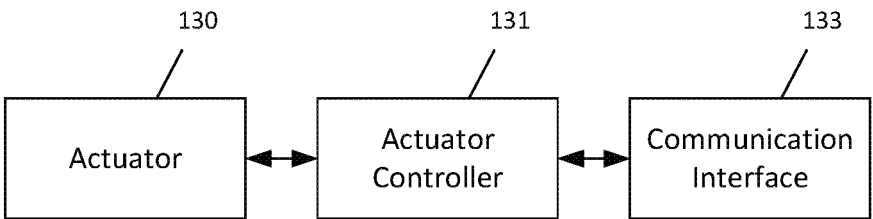
FIG. 10 is a block diagram illustrating components of actuated markers of FIG. 8A, FIG. 8B, FIG. 8C, and FIG. 8D, where a characteristic of marker frequency or speed conveys unique and unambiguous information to a vehicle.

FIG. 10 depicts components of an actuator marker in greater detail. Actuator 130 is attached to moving elements of an actuator marker either directly or indirectly, such as to arms 126, 134. An actuator controller 131 communicates with actuator 130 and with a communication interface 133. Controller 131 receives information to communicate via marker actuation from communication interface 133, which may allow a user to transmit a message locally at the marker or remotely using wireless communication. Thus, actuator markers are capable of receiving a message from a remote location (e.g., a remote server) and delivering the message to one or more vehicles. The message may be updated or changes as may be desired. After a message is provided by the communication interface 133, actuator controller 131 directs actuator 130 to impart a corresponding motion or pattern of motion to convey the message. Thus, different element positions, rotational frequencies, rotational directions, or other actuated characteristics are adjusted by actuator 130 to convey a message, such as an encoded message or unique signature.

Figures 8A, 8B:
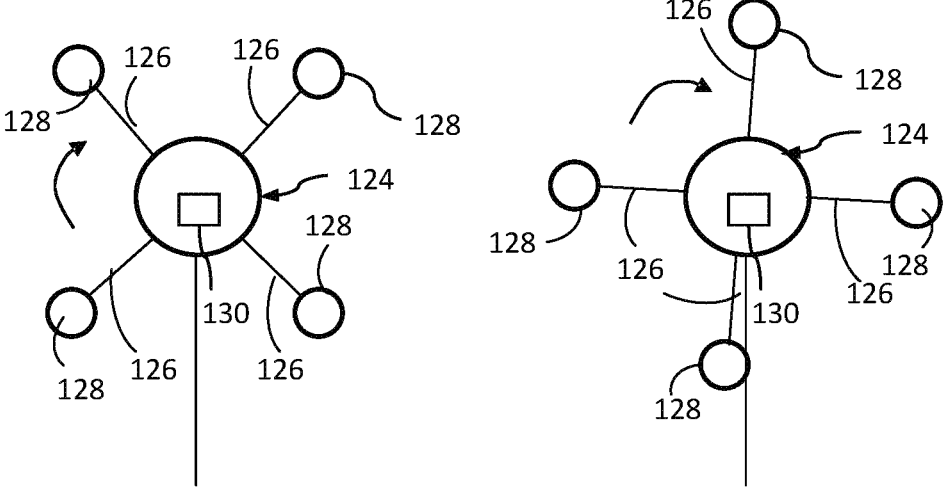
FIG. 8A is a schematic illustration of an exemplary embodiment of radar reflective markers, such as are depicted by FIG. 1, where a characteristic of marker spinning frequency or speed conveys unique and unambiguous information to a vehicle.
FIG. 8B is a schematic illustration of an exemplary embodiment of radar reflective markers, such as are depicted by FIG. 1, where a characteristic of marker spinning frequency or speed conveys unique and unambiguous information to a vehicle. Marker element position has rotated relative the position in FIG. 8A.

In the exemplary embodiment depicted in FIG. 8A, actuator marker 124 has arms 126 that extend from the marker 124 and are attached to elements 128. When actuator 130 drives actuator marker 124, arms 126 with elements 128 rotate about a central point of rotation at a frequency and in a direction that is detectable using radar system 14. FIG. 8A shows the marker 124 in a first orientation, and FIG. 8B shows the marker 124 after the elements 128 have been rotated clockwise by an amount. The radar system 14 is configured to recognize element position and changes in position over time, which vehicle controller 20 interprets as a unique signature or encoded message. For instance, frequencies may be sampled over a period of time, such as every half second or tenth of a second. When frequencies change over the sampling period, a message or portion of a message may be provided and interpreted using control logic 54 or entries in a database in memory 52. While arms 126 are depicted in FIG. 8A, actuator marker 124 is contemplated to have different reflector elements in embodiments not depicted, such as blades, spokes, rotors, or other rotatable or moveable elements. As actuator 130 imparts motion, the motion is implemented at specific times in some instances, is constant in some instances, or is periodic over time in other instances. For rotating motion, the frequency is constant in some instances or variable in other instances.

Figure 9A:
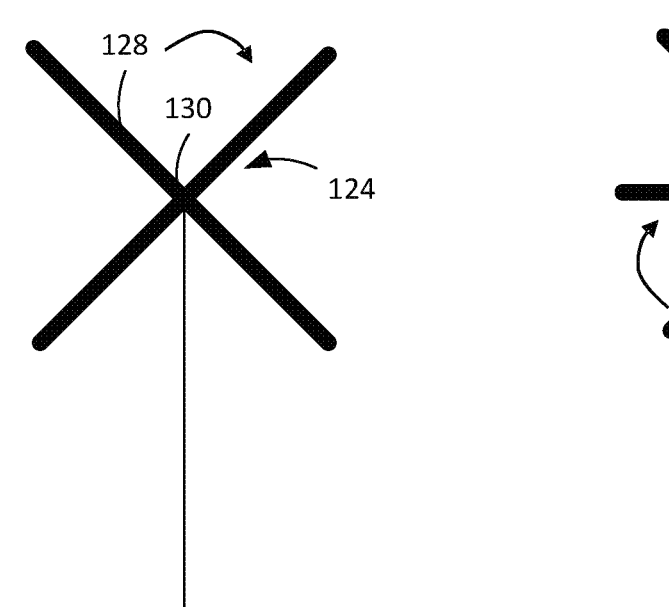
FIG. 9A is a schematic illustration of an exemplary embodiment of radar reflective markers, such as are depicted by FIG. 1, where a characteristic of marker spinning frequency or number of blades conveys unique and unambiguous information to a vehicle.
Figure 9B:
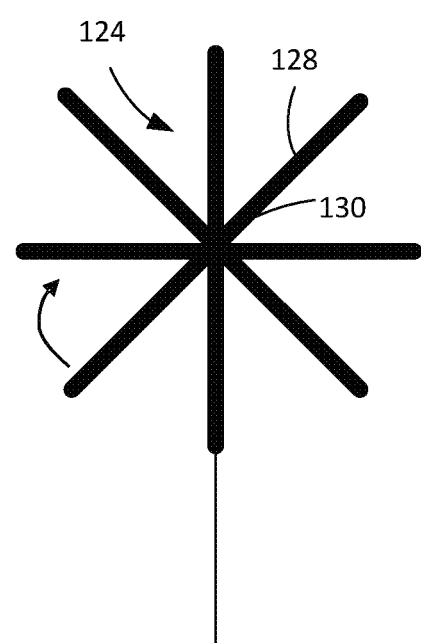
FIG. 9B is a schematic illustration of an exemplary embodiment of radar reflective markers, such as are depicted by FIG. 1, where a characteristic of marker spinning frequency or number of blades conveys unique and unambiguous information to a vehicle. Marker element position has rotated relative the position in FIG. 8A.

In some embodiments, such as the embodiment depicted in FIGS. 9A and 9B, the actuator 130 serves as an actuator marker 124, where characteristics such as the number of elements 128 or speed of rotation convey information to radar system 14. In the example depicted in FIG. 9A, there are four elements 128 on actuator marker 124, while in FIG. 9B there are eight elements 128 on actuator marker 124. The radar controller 17 of the radar system 14 may be configured to count the number of elements 128 on a given marker and use such information as input indicating a parameter of the marker, such as marker type. Also, the radar controller 17 may be configured to determine the speed or rotational frequency of the elements 128 and use such information as input indicating another parameter, such as a data value or other type of information. For example, in FIG. 9A, the four elements 128 may indicate that actuator marker 124 represents a traffic signal, where speed or rotational frequency of actuator marker 124 indicates a red, yellow, or green traffic light. In FIG. 9B, the eight elements 128 may, for example, indicate that actuator marker 124 represents a speed limit, where a speed or rotational frequency of actuator marker 124 indicates a speed limit value.

In some embodiments, the rotational frequency or other movement speed or direction may be modulated to convey an encoded signal. For example, a rotational frequency or speed above a predetermined threshold may be determined to convey a binary "1" value, where a frequency below the predetermined threshold may be determined to convey a binary "0" value. Thus, the frequency or other movement speed may be modulated over time to convey a stream of binary values, which encodes a message, value, or parameter that is interpreted by vehicle controller 20. For example, frequency modulation may be used to convey a binary message of 00 for the color red, 01 for the color yellow, and 10 for the color green at a traffic signal.

In another example, the actuator 130 may encode information using the orientation of one or more elements 128. As an example, a bit or character may be encoded each sampling period by moving the elements 128 to a certain position for the sampling period. For example, the orientation shown by FIG. 8A may represent a binary "0" and the orientation shown by FIG. 8B may represent a binary "1". For a given sampling period for a bit, the actuator 130 may move the elements 128 to the appropriate orientation to convey the desired bit value.

Figures 8C, 8D:
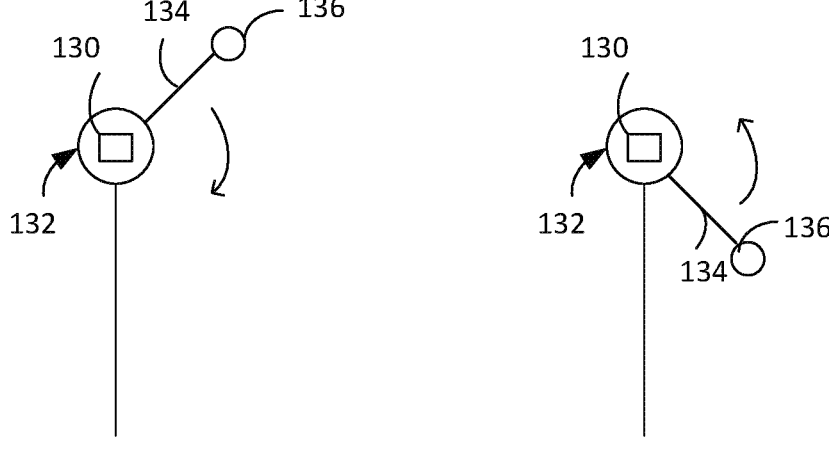
FIG. 8C is a schematic illustration of an exemplary embodiment of radar reflective markers, such as are depicted by FIG. 1, where a characteristic of marker rotating frequency or speed conveys unique and unambiguous information to a vehicle.
FIG. 8D is a schematic illustration of an exemplary embodiment of radar reflective markers, such as are depicted by FIG. 1, where a characteristic of marker rotating frequency or speed conveys unique and unambiguous information to a vehicle. Marker element position has rotated relative the position in FIG. 8C.

In FIG. 8C, actuator marker 132 has an arm 134 that extends and connects to an element 136. While one arm 134 and element 136 is depicted, more than one arm 134 and element 136 is compatible with the present disclosure. When actuator 130 drives actuator marker 132, arms 134 with elements 136 rotate or move at a velocity or frequency that is detectable using radar system 14. FIG. 8C shows the marker 132 in a first orientation, and FIG. 8D shows the marker 132 after element 136 has been rotated clockwise by an amount. Radar system 14 further detects the position of elements 136 or the change in position of elements 136 over a sampling period. Rotation or motion modulates the position of one or more of rotating elements 136, where the velocity, acceleration, frequency and/or rotating element position provides a unique radar signature that is interpreted by vehicle controller 20. When velocity or frequency is a characteristic that conveys the unique radar signature, it may be done as described for actuator marker 124 in FIG. 8A. When position of elements 136 conveys the unique radar signature, radar system 14 is configured to interpret different rotating element positions, elevations, azimuths, or ranges as corresponding to different unique radar signatures that impart different encoded messages or parameters.

For example, in FIG. 8C, a raised element 136 may indicate one situation, while a lowered element 136 as in FIG. 8D may indicate another situation. This may indicate that when element 136 is raised, road work is ongoing and a lower speed limit is in force, while when element 136 is lowered, no road work is occurring and a higher speed limit is indicated. In another instance, the arm 134 may be utilized to move element 136 at a frequency or frequencies, which may be interpreted as described above for actuator marker 124 in FIG. 8A.

Referring now to FIG. 11, a radar-based information system 11 for localization using localization markers 138, 140, and 142 is depicted. The radar-based information system 11 includes one or more markers 138, 140, and 142, that are positioned such that vehicle 12 with radar system 14 is capable of detecting reflected radio waves and interpreting unique radar signatures for each marker 138, 140, and 142. In the depicted embodiment, three markers 138, 140, and 142 are shown, though more or less markers with different shapes, sizes, reflective elements, positions, spacings, or configurations are contemplated by the present disclosure. The depicted embodiment shows first location marker 138 and second location marker 140 on a side of roadway 22 closest to first road boundary 30, and third location marker 142 closest to second road boundary 32, though other locations and positions of markers not depicted are contemplated by the present disclosure.

When vehicle 12 is proximate markers 138, 140, and 142, radar system 14 receives characteristic information for each marker, which includes a unique radar signature for each marker. The unique radar signature is interpreted by vehicle controller 20 to convey a distinct encoded message for each marker 138, 140, and 142, where the encoded message is, in some instances, an identification and/or geolocation of each marker 138, 140, and 142.

As an example, as noted above, the marker data 53 may store information correlating each marker with its respective location, such as the marker's coordinates (e.g., latitude and longitude) within a predefined coordinate system. Based on the radar returns from the markers 138, 140, and 142, the vehicle controller 20 may be configured to identify each marker 138, 140, and 142 using the techniques described above and then use the marker data 53 to determine each marker's location within the predefined coordinate system. Based on other information gleaned from the returns, such as the range, azimuth, and elevation of each marker 138, 140, and 142 relative to the vehicle 12, the vehicle controller 20 may determine the vehicle's location relative to the locations of the markers 138, 140, and 142. The vehicle controller 20 may then use known algorithms, such as trilateration, triangulation, or multilateration to determine the vehicle's location within the predefined coordinate system, as will be described in more detail below.

In other embodiments, other techniques may be used to determine the vehicle's location. As an example, a given marker 138, 140, and 142 may be configured to convey a message that includes at least one numerical value representing a distance of the marker from a reference point. For example, the value may indicate the marker's distance from a shoulder or a centerline or boundary line of the roadway or lane on which the vehicle 12 is traveling. Using this information as well as the marker's distance from the vehicle 12, the vehicle controller 20 may determine the vehicle's location from the reference point.

In some instances, the encoded message may be an identification and/or geolocation of an object corresponding to each marker 138, 140, and 142. Such an object is, for example, a piece of equipment, a vehicle, a structure, infrastructure, a pipeline, a natural feature, a material, or another identifiable object. As an example, a marker 138, 140, or 142 corresponding a particular object may be positioned in close proximity to such object in order to mark the approximate location of that object. Such marker may convey an identification of or other information corresponding to the object such that, by locating the marker, the location of the object is known or determinable. In some instances, an object identified using markers 138, 140, and/or 142 may be visibly obscured or hidden such that locating the object without use of the corresponding marker may be difficult, (e.g., when the object is covered in snow or located underground). For example, the approximate location of a hidden underground water pipeline may be indicated by a corresponding marker 138, 140, or 142 so that large vehicles, such as mining trucks, avoid damage to the pipeline. In another example, a piece of snow clearing equipment that is left on a side of a roadway may be identified even when obscured with snow so that it may be relocated and retrieved. Locations of markers and nearby objects may be understood by a vehicle controller 20 to be relative to a known coordinate system, such as a global positioning system indicating latitude and longitude.

To better illustrate some of the concepts described above, assume that it is desirable for the markers 138, 140, and 142 to be used to determine the location of the vehicle 12 within a predefined coordinate system. For illustrative purposes, assume that this predefined coordinate system, referred to hereafter as "local coordinate system," is relative to a stationary reference point or origin. Thus, the locations within such local coordinate system of various stationary objects, such as the road, lanes, roadway exits, bridges, etc. may be known. In addition, the locations (e.g., coordinates) of the markers 138, 140, and 142 within this local coordinate system may be known and stored in the marker data 53.

Further assume that the vehicle 12 is traveling at a location where it receives returns from the markers 138, 140, and 142. Based on the returns, the radar system 14 can determine the location of each marker 138, 140, and 142 relative to the radar system 14 and, thus, the vehicle 12. As an example, the radar system 14 can determine the range, azimuth and elevation of each marker 138, 140, and 142 and communicate this information to the vehicle controller 20. In addition, the radar system 14 may also communicate sufficient information about the signatures from the markers 138, 140, and 142 such that the vehicle controller 20 can identify each marker 138, 140, and 142. Using the marker data 53, the vehicle controller 20 can determine the location of each identified marker 138, 140, and 142 within the local coordinate system. In this regard, as described above, the vehicle controller 20 may identify each marker 138, 140, and 142 based on its respective radar signature, which is unique to that marker. After identifying each marker 138, 140, and 142, the vehicle controller 20 may analyze the marker data 53 to determine the coordinates or other location information of each identified marker 138, 140, and 142 within the local coordinate system. Knowing the locations of the markers 138, 140, and 142 within the local coordinate system and the vehicle's location relative to the markers 138, 140, and 142, the vehicle controller 20 may then use trilateration, triangulation, multilateration, or other algorithm to determine the vehicle's location (e.g., coordinates) within the local coordinate system.

For example, in the depicted embodiment, the distance between vehicle 12 and marker 138 is shown as first radius 144, the distance between vehicle 12 and marker 140 is shown as second radius 146, and the distance between vehicle 12 and marker 142 is shown as third radius 148. In this example, multilateration may be used by the vehicle controller 20 to determine the vehicle location 150 within the local coordinate system from radii 144, 146, and 142 and known marker locations within the local coordinate system. In embodiments not shown, angular dimensions detected by radar system 14 of each marker 138, 140, and/or 142 relative to the vehicle 12 may be used with a triangulation approach to determine vehicle location 150. Vehicle location 150, when determined using markers 138, 140, and/or 142 may be more accurate relative to locations determined using GPS. For example, local position or vehicle location 150 may be determined within an accuracy of just a few centimeters according to the disclosed localization system, though other margins are possible in other embodiments. Further, triangulation or multilateration using markers 138, 140, and/or 142 to determine a local position is possible in regions where satellite connectivity is reduced or insufficient for GPS functionality in vehicle 12.

In some embodiments, the vehicle controller 20 may use the vehicle's location within the local coordinate system to make a variety of control decisions and/or to determine or otherwise calculate parameters to be used in control decisions. As an example, by comparing the vehicle's location over time, the vehicle controller 20 may accurately detect the vehicle's instantaneous or average speed or determine the vehicle's position relative to another object such the vehicle's position within the roadway or lane, and proximity to an object or hazard within or near the vehicle's trajectory. In this regard, as noted above, the locations of various stationary objects, such as roads, lanes, exits, and roadside or roadway hazards may be known, and information indicative of such locations may be stored by the vehicle controller 20. As an example, the vehicle controller 20 may store a geographical map indicating the locations of these objects within the map. The vehicle controller 20 may be configured to compare the vehicle's determined location to the locations of the objects in the map to make various control decisions. As an example, the vehicle controller 20 may control the velocity of the vehicle 12 in order to navigate the vehicle 12 along the roadway or to avoid a hazard.

Note that the precision of the vehicle's location within the local coordinate system enables the vehicle controller 20 to make control decisions that may be not possible with less accurate systems, such as GPS. As an example, the vehicle controller 20 may precisely control the vehicle's location within a lane by comparing the vehicle's location to the location of the lane in the stored map. For example, the vehicle controller 20 may control the vehicle 12 such that the center of the vehicle 12 travels along the centerline of the lane or that the tires (or other vehicle component) are a precise distance from an edge of the lane or other reference point. In some embodiments, where the distance or location of a marker 138, 140, and 142 from a road or lane is known, the vehicle controller 20 may precisely position the vehicle 12 within the lane by controlling the vehicle's location from the marker. Various other techniques may be used to control the position of the vehicle 12 in a lane or on a roadway in other embodiments.

As described above, the vehicle controller 20, in some embodiments, initiates responses to information conveyed using radar reflective markers 10 and/or other sensor or vehicle system input. Responses include, for instance, directing vehicle systems to alter speed, vehicle position, or a combination thereof. Other responses include alerting passengers to a condition or parameter conveyed by markers 10. Other responses to information conveyed, at least in part, by markers 10 are contemplated by the present disclosure. In order to respond to such information, vehicle controller 20 is configured to communicate with system controllers 21 or other controllers not depicted in FIG. 2. Communication with system controllers 21 is, in some instance, direction to alter vehicle components, systems, or operation in response to information conveyed, at least in part, by markers 10.

For example, when the vehicle location 150 is determined by vehicle controller 20 from markers 138, 140, and/or 142, the local position may be determined with such precision that position within lane 24, position relative to road or lane boundary 30, 32, or position relative to centerline 28 is known. The vehicle controller 20 may be configured to identify when vehicle 12 is or is not in a desirable local position, and adjust vehicle position within lane 24 relative to road or lane boundary 30, 32 or to centerline 28 when a change to the local position is desired. As an example, in instances where markers 10 convey a message regarding a hazard or object impeding a vehicle's intended path, the vehicle controller 20 may be configured to direct vehicle 12 into another lane, when available, or to slow or stop vehicle 12 prior to impact with the hazard or object.

In some instances, the local positions of vehicles 12 within a lane may be controlled such that wear on the roadway is better distributed across the surface of the lane 24. In this regard, if a large number of autonomous vehicles are controlled to drive precisely along the centerline of a lane (e.g., where the center of the vehicle 12 travels substantially along the centerline), then it is likely that the tires of the vehicles will make contact with the lane in substantially the same regions. This is in contrast to human drivers that may be more susceptible to veering and thus vary the relative positioning of vehicles within a lane in a more random fashion. In addition, the wear of a roadway may be particularly problematic along certain roads that carry a relatively large number of heavy vehicles, such as dump trucks, 18-wheelers, or other vehicles that typically carry heavy cargo.

To help distribute wear across a surface of a lane more evenly, the vehicle controllers 20 of different vehicles may control the vehicles 12 such that each vehicle 12 travels at a slightly different position or offset from the lane centerline relative to other vehicles. There are various techniques that can be used to achieve this effect. In some embodiments, each vehicle 12 is assigned an offset value indicating amount of offset from a reference point, such as a lane boundary or centerline, that the vehicle 12 is travel down a lane 24. The offset values may be randomly assigned within a certain range so that the offset value of each vehicle 12 is likely different than most if not all of the other vehicles 12, but other techniques for determining the offset values are possible.

After the vehicle controller 20 receives the offset value assigned to its vehicle 12, the vehicle controller 20 controls operation of the vehicle 12 so that it travels down a lane at the offset assigned to it. In controlling the position of the vehicle 12 within the lane 24, the vehicle controller 20 may determine the vehicle's local position based on radar reflections from the markers described above, or some other techniques for determining the vehicle's location may be used (e.g., using a camera that images a lane so that the vehicle's position within the lane may be determined by identifying road markings or boundaries in the captured images).

In some embodiments, the offset values are algorithmically determined based on various factors, such as vehicle type, size, or weight. In this regard, the offset values assigned to the vehicles 12 may be controlled by a central or remote server (not shown) in communication with the vehicle controllers 24. Each vehicle controller 24 may be configured to submit a request for an offset value for a lane 24 as the vehicle 12 is traveling down the lane 24 or before entering the lane 24. Such request may include information about the vehicle 12, such as it type, size, or weight. In response to receiving such request, the remote server may be configured to use the vehicle information in the request, such as type, size, or weight, to determine an offset value for the vehicle 12 and return such offset value to the vehicle controller 20 for use in controlling the position of the vehicle 12 within the lane 24, as described above. As an example, the remote server may consider the offsets assigned to other vehicles of a similar type, size, or weight and select an offset value for the current vehicle 12 that is significantly different than the offset values or the average of the offset values for the other vehicles of a similar type, size, or weight. Various other techniques for selecting a desired offset value are possible.

An embodiment of a spinning actuator marker 212 is depicted in FIG. 12, where a traffic light assembly 210 encases or otherwise supports actuator marker 212. The frequency or speed of rotation of the marker 212 conveys a unique radar signature that corresponds to the signal conveyed by the traffic light assembly 210. For instance, one frequency may indicate that the traffic light assembly 210 is conveying a red (stop) signal, another frequency may indicate that the traffic light assembly 210 is conveying a green (go) signal, and another frequency may indicate that the traffic light assembly 210 is conveying a yellow signal, as described for FIG. 8A. However, other messages are capable of being conveyed by the marker 212. For instance, the frequency of the marker 212 may be configured to convey a message alerting a vehicle 12 to an impending change in the traffic signal, such as from red-to-green, yellow-to-red, or green-to-yellow, and thus permit vehicle controller 20 to adjust vehicle speed or operation accordingly.

As an example, knowing that the traffic light assembly 210 is about to transition from green-to-yellow, the vehicle controller 20 of an approaching vehicle 12 may begin to slow sooner than it otherwise would relative to an embodiment in which it was only able to discern the current state of the traffic light assembly 210. This may help to improve safety or conserve fuel. In some embodiments, the frequency of the marker 212 may convey a value indicative of the time that the traffic light assembly 210 will transition to the next state. For example, the marker 212 may convey a countdown where the value conveyed is decreased to mark the current time remaining until the change of state, such as a transition from green-to-yellow, yellow-to-red, or red-to-green. Thus, the frequency of rotation may be continuously or repetitively changed to indicate such time remaining. In other embodiments, other techniques are possible for indicating the amount of time remaining or that a transition of a state of the traffic light assembly 210 is imminent. For example, the positional orientation of a marker may be used to indicate the state of the traffic light assembly 210, according to the techniques described above for FIGS. 8A and 8B.

Note that the location of marker 212 is shown in a top portion of the traffic light assembly 210 in the depicted example, such as at the location of or coupled to a red light of the assembly 210 though other locations are contemplated. As an example, a respective marker 212 may be located on or coupled to each light of the assembly. In such an example, the corresponding marker 212 at or coupled to a light currently emitting a light signal may be activated (e.g., spinning) while the other markers are deactivated (e.g., not spinning) to indicate which lights are currently emitting signals. In another embodiment, the light(s) currently emitting a signal may be spinning at one frequency or rate while the light(s) that for which emission of a signal is eminent may be spinning at another frequency or rate to indicate the impending transition of the state of the assembly 210. In some instances, a marker 212 may be located proximate, but not connected to, the traffic light assembly 210.

Referring now to FIG. 13, an embedded radar reflective marker 312 is shown attached to or embedded within a lane reflector 310. Such a lane reflector 310 may be positioned on a roadway to indicate a boundary or other aspect of the roadway. As an example, reflectors 310 may be positioned along a lane line (e.g., centerline 314 of a roadway) that is used to mark a boundary of the lane. The reflector 310 is composed of a material that reflects light from the headlights of vehicles so that drivers can better visualize the boundary or other reference marked by the reflector 310 at night or during reduced visibility.

The marker 312 is positioned to provide radar-detectable information about the location of centerline 314 or other lane or road boundaries. That is, by reflecting radar signals, the marker 312 and, thus, reflector 310 is visible to the radar system 14 such that the vehicle controller 20 can use the radar information from the radar system 14 to determine the location of the boundary marked by the marker 312 and reflector 310. Such information may be particularly helpful when road conditions make visual detection of boundaries difficult or impossible, such as when roads are covered in snow or in low light conditions.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

The invention claimed is:

1. A system for communicating information to vehicles, comprising:
  at least one spatially-encoded marker coupled to a traffic light; and
  a vehicle having at least one controller and a radar, the radar configured to transmit a radar signal and receive returns of the radar signal from the at least one spatially-encoded marker, the at least one controller configured to determine a message comprising a radar signature encoded by the spatially-encoded marker based on the returns;
  wherein the at least one spatially-encoded marker comprises a moveable element and an actuator coupled to the movable element, wherein the actuator is configured to move the moveable element, and wherein the at least one controller is configured to determine the message based on a relative position of the movable element;
  wherein the at least one controller is configured to determine a value indicative of the relative position of the moveable element, and wherein the at least one controller is configured to determine the message based on the value;
  wherein the message conveys a current state of a traffic light signal of the traffic light;
  wherein the at least one controller is configured to
    determine a location of the at least one spatially-encoded marker within a local coordinate system based on the message,
    determine a location of the at least one spatially-encoded marker relative to the vehicle based on the returns, and
    determine a location of the vehicle within the local coordinate system based the determined location of the at least one spatially-encoded marker within the coordinate system and the determined location of the spatially-encoded marker relative to the vehicle.

2. The system of claim 1, wherein the at least one controller is configured to control the vehicle based on the message.

3. The system of claim 1, wherein the at least one controller is configured to display information from the message to occupants of the vehicle.

4. The system of claim 1, wherein the at least one controller is configured to identify a spatial or movement pattern of the at least one spatially-encoded marker based on the returns and to determine an impending change in the traffic light signal of the traffic light.

5. The system of claim 4, wherein the at least one controller is configured to interpret the spatial or movement pattern as a binary stream from the at least one spatially-encoded marker.

6. The system of claim 1, wherein the at least one controller is configured to determine a location of the at least one spatially-encoded marker based on the message.

7. The system of claim 6, wherein the at least one controller is configured to determine a location of the vehicle based on the determined location of the at least one spatially-encoded marker.

8. The system of claim 1, wherein the at least one controller is configured to identify an object proximate the at least one spatially encoded marker based on the message.

9. The system of claim 1, wherein the at least one controller is configured to identify a spatial pattern of the at least one spatially-encoded marker based on the returns and to determine the message based on the identified spatial pattern.

10. The system of claim 9, wherein the at least one spatially-encoded marker comprises at least a first marker and a second marker, and wherein the spatial pattern includes a spacing between the first marker and the second marker.

11. The system of claim 9, wherein the at least one spatially-encoded marker comprises a plurality of elements, and wherein the spatial pattern includes an orientation of the plurality of elements.

12. A method for communicating information to a vehicle, comprising:

transmitting a radar signal from a radar on the vehicle;
receiving, with the radar, returns of the radar signal from at least one spatially-encoded marker coupled to a traffic light, wherein the at least one spatially-encoded marker comprises a moveable element, wherein receiving returns of the radar signal further comprises detecting a relative position of the movable element;
determining based on the returns, with at least one controller on the vehicle, a message comprising a radar signature encoded by the spatially-encoded marker by determining a value indicative of the relative position of the movable element, wherein the determining of the message is based on the value and the message conveys a current state of a traffic light signal of the traffic light;
determining a location of the at least one spatially-encoded marker within a local coordinate system based on the message;
determining a location of the at least one spatially-encoded marker relative to the vehicle based on the returns; and
determining a location of the vehicle within the local coordinate system based the determined location of the at least one spatially-encoded marker within the coordinate system and the determined location of the spatially-encoded marker relative to the vehicle; and
controlling the vehicle based on the message.

13. The method of claim 12, further comprising identifying a spatial or movement pattern of the at least one spatially-encoded marker based on the returns, and determining an impending change in the traffic light signal of the traffic light.

14. The method of claim 13, further comprising interpreting the spatial or movement pattern as a binary stream from the at least one spatially-encoded marker.

15. The method of claim 12, further comprising determining a location of the at least one spatially-encoded marker based on the message.

16. The method of claim 15, further comprising determining a location of the vehicle based on the determined location of the at least one spatially-encoded marker.

17. The method system of claim 12, further comprising identifying an object proximate the at least one spatially encoded marker based on the message.

18. The method of claim 12, further comprising identifying a spatial pattern of the at least one spatially-encoded marker based on the returns, wherein the determining the message is based on the identified spatial pattern.

19. The method of claim 18, wherein the at least one spatially-encoded marker comprises at least a first marker and a second marker, and wherein the identifying comprises determining a spacing between the first marker and the second marker.

20. The method of claim 18, wherein the at least one spatially-encoded marker comprises a plurality of elements, and wherein the identifying comprises determining an orientation of the plurality of elements.

* * * * *